US011503069B2

(12) United States Patent
Soryal

(10) Patent No.: US 11,503,069 B2
(45) Date of Patent: Nov. 15, 2022

(54) PROTECTION AGAINST MAN-IN-THE-MIDDLE ATTACKS IN VIRTUALIZATION ENVIRONMENTS

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 344 days.

(21) Appl. No.: 16/795,785

(22) Filed: Feb. 20, 2020

(65) Prior Publication Data

US 2021/0266344 A1    Aug. 26, 2021

(51) Int. Cl.
*H04L 29/06* (2006.01)
*H04L 9/40* (2022.01)
*G06F 9/455* (2018.01)
*H04J 3/06* (2006.01)

(52) U.S. Cl.
CPC ...... *H04L 63/1466* (2013.01); *G06F 9/45558* (2013.01); *H04J 3/0682* (2013.01); *H04L 63/1425* (2013.01); *G06F 2009/45575* (2013.01)

(58) Field of Classification Search
CPC . H04L 63/1466; H04L 63/1425; H04L 63/14; H04L 63/1416; H04L 63/0861; G06F 9/45558; G06F 2009/45575; G06F 21/55; H04J 3/0682; H04W 12/12
See application file for complete search history.

(56) References Cited

U.S. PATENT DOCUMENTS

2017/0318008 A1*  11/2017  Mead ................... H04L 63/0861
2017/0353490 A1*  12/2017  Krauss ................ H04L 63/1416
2019/0379653 A1    12/2019  Mead

FOREIGN PATENT DOCUMENTS

WO    WO 2019/116370    6/2019

OTHER PUBLICATIONS

International Search Report and Written Opinion dated May 10, 2021 issued in International Application No. PCT/US2021/018708.
Fan et al., "Enabling an Anatomic View to Investigate Honeypot Systems: A Survey," IEEE Systems Journal, vol. 12, No. 4, Nov. 2017, IEEE.

* cited by examiner

Primary Examiner — Vinncelas Louis
(74) Attorney, Agent, or Firm — Hartman & Citrin LLC

(57) ABSTRACT

A man-in-the-middle protection module can monitor data traffic exchanged between a source and destination nodes over a source-destination link via a network. The module can utilize a traffic probe packet to determine a packet delay associated with the data traffic. The module can store the packet delay and can determine that the packet delay is greater than a normal packet delay. If so, the module can determine that an attacker has compromised the source-destination link. The module can command a virtual machine associated with the source node to be decommissioned. The module can instruct a virtualization orchestrator to create a new source node. The data traffic can be rerouted to be exchanged between the new source node and the destination node over a new source-destination link via the network. The module can create and send fake data traffic towards the MitM attacker over the source-destination link via the network.

20 Claims, 7 Drawing Sheets

PROTECTION AGAINST MAN-IN-THE-MIDDLE ATTACKS IN VIRTUALIZATION ENVIRONMENTS

BACKGROUND

In today's connected world, data has become a valuable resource to governments, businesses, and individuals alike. Malicious attackers that seek to obtain this resource use sophisticated cyber-attacks, such a denial-of-service ("DoS"), distributed denial-of-service ("DDoS"), man-in-the-middle ("MitM"), phishing, eavesdropping, and password attacks, among others, to steal personal, financial, and other sensitive data. As a result, cyber security has become a primary focus of governments, businesses, and individuals to prevent cyber-attacks and to remediate after an attack. Prevention, however, is paramount and existing prevention methodologies are not well-suited for virtualized environments that are becoming more commonplace today.

SUMMARY

Concepts and technologies disclosed herein are directed to protection against man-in-the-middle ("MitM") attacks in virtualization environments. According to one aspect of the concepts and technologies disclosed herein, a MitM protection ("MitMP") module can monitor data traffic exchanged between a source node and a destination node over a source-destination link via a network. The MitMP module can be associated with the source node. The source node can include a virtual machine. The MitMP module can utilize a traffic probe packet to determine a packet delay value associated with the data traffic exchanged between the source node and the destination node over the source-destination link via the network. The MitMP module can store the packet delay value. The MitMP module can determine that the packet delay value is greater than a normal packet delay value. In response to determining that the packet delay value is greater than the normal packet delay value, the MitMP module can determine that a MitM attacker has compromised the source-destination link. The MitMP module can command the virtual machine to be decommissioned. The MitMP module can instruct a virtualization orchestrator to create a new source node, a new virtual machine, and a new MitMP module. The data traffic can be rerouted to be exchanged between the new source node and the destination node over a new source-destination link via the network. The MitMP module can create fake data traffic that includes replica data packets of data packets contained in the data traffic. The MitMP module can send the fake data traffic towards the MitM attacker over the source-destination link via the network.

In some embodiments, the MitMP module can store the packet delay value in a distributed ledger. The distributed ledger can be implemented via blockchain or other similar technology. The packet delay value can include an average packet delay value. The MitMP module can map the network with a most recent packet delay value for each link in the network. The MitMP module can determine that the packet delay value is greater than the normal packet delay value by comparing the most recent packet delay value to the normal packet delay value.

In some embodiments, the MitMP module can create the fake data traffic based upon a characteristic of the data traffic. For example, the MitMP module can generate replica data packets of the data packets contained in the data traffic with the same payload size and header information but with different raw data. The raw data can be randomly or pseudo-randomly generated or can be sourced from a database of expired or otherwise no longer relevant data.

According to another aspect of the concepts and technologies disclosed herein, a distributed MitMP system can include a plurality of nodes operating in a network provided, at least in part, via a virtualization environment. The plurality of nodes can include a source node and a destination node. The source node can include a virtual machine and a MitMP module. The MitMP module can include computer-executable instructions that, when executed, perform operations. The MitMP module can monitor data traffic exchanged between the source node and the destination node over a source-destination link via the network. The MitMP module can utilize a traffic probe packet to determine a packet delay value associated with the data traffic exchanged between the source node and the destination node over the source-destination link via the network. The MitMP module can store the packet delay value and can determine that the packet delay value is greater than a normal packet delay value. In response to determining that the packet delay value is greater than the normal packet delay value, the MitMP module can determine that a MitM attacker has compromised the source-destination link. The MitMP module can then command the virtual machine to be decommissioned. The MitMP module also can instruct a virtualization orchestrator to create a new source node, a new virtual machine, and a new man-in-the-middle protection module. The data traffic can be rerouted to be exchanged between the new source node and the destination node over a new source-destination link via the network. The MitMP module can create fake data traffic that includes replica data packets of data packets contained in the data traffic. The MitMP module can send the fake data traffic towards the MitM attacker over the source-destination link via the network.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
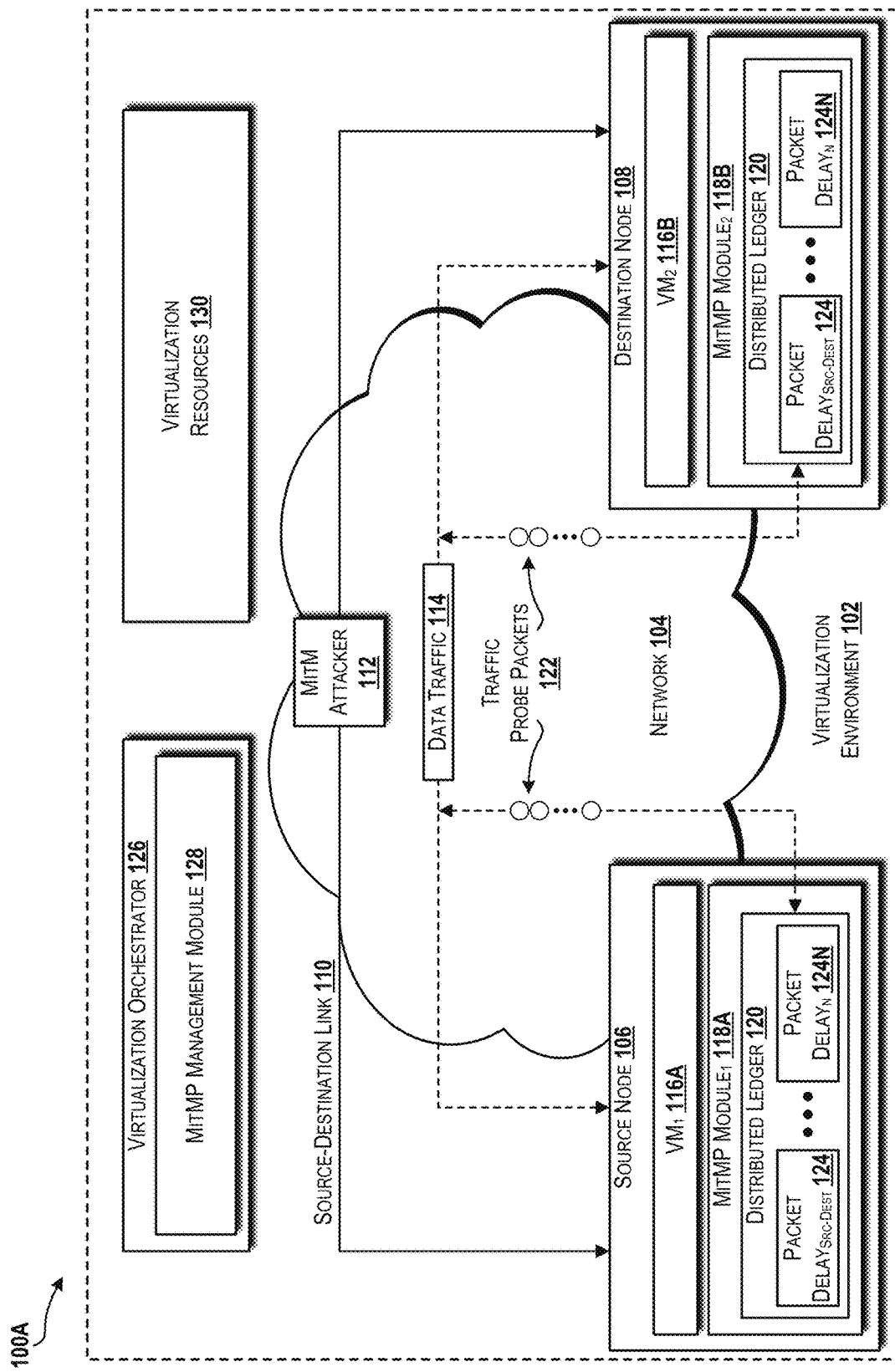
FIGS. 1A and 1B are block diagrams illustrating aspects of an illustrative operating environment for various concepts disclosed herein.

The concepts and technologies disclosed herein provide a distributed man-in-the-middle protection ("MitMP") system that resides in every node of a network and continuously monitors incoming and outgoing data traffic of each node. The distributed MitMP system includes a plurality of MitMP modules, each of which is associated with a specific node in the network. The MitMP modules communicate with each other via traffic probe packets to map out packet delays among all links in the network. The packet delay values for each link are known to each MitMP module and stored using a distributed ledger (e.g., blockchain or other similar technology). Each MitMP module can map out the network with the most recent delay values. After a MitMP module detects that the data traffic has higher packet delays than normal (where normal delay can be established over time for each link in the network), the MitMP module can command a virtual machine that resides on the same node as the MitMP module to be decommissioned. The MitMP module can then communicate with a virtualization orchestrator, which can create a new node with a new MitMP module while the old node continues to send fake data traffic created by the MitMP module to convince the malicious attacker that the MitM attack is/was successful. Each MitMP module can be created by the virtualization orchestrator. The virtualization orchestrator can keep track of the status of each MitMP module using a MitMP management module that handles all aspects and updates for all MitMP modules. Each MitMP module can have an authentication key to securely communicate with the virtualization orchestrator.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for protection against MitM attacks in virtualization environments will be described.

Referring now to FIG. 1A, aspects of an illustrative operating environment 100A for various concepts disclosed herein will be described. It should be understood that the operating environment 100A and the various components thereof have been greatly simplified for purposes of description. Accordingly, additional or alternative components of the operating environment 100A can be made available without departing from the embodiments described herein.

The illustrative operating environment 100A includes a virtualization environment 102 that provides, at least in part, a network 104 over which a plurality of nodes can communicate. In the illustrated example, the network 104 includes a source node 106 and a destination node 108 that are in communication with each other over the network 104 via a source-destination link 110. The source-destination link 110 has been compromised by a MitM attack executed by a MitM attacker 112. The MitM attacker 112 can intercept data traffic 114 exchanged between the source node 106 and the destination node 108. The data traffic 114 may contain data that is sensitive in nature, such as personal data, financial data, security data (e.g., username and password), and the like. Although aspects of the concepts and technologies disclosed herein focus on malicious cyber-attacks, the concepts and technologies disclosed herein may find applicability to other implementations such as network congestion and/or other network phenomenon.

Both the source node 106 and the destination node 108 can be any node capable of communication via the network 104. For example, the source node 106 and the destination node 108 can be any device, system, server, network function, virtual network function ("VNF"), network router, network switch, other network node, combinations thereof, and the like. The source node 106 and the destination node 108 can operate in any plane of the network 104, including the control plane, application/management plane, or data plane. For ease of description, the source node 106 and the destination node 108 will be described in a client-server configuration in which the source node 106 is the server and the destination node 108 is the client operating in the data plane. It should be understood that this example is merely exemplary and should not be construed as limiting in any way.

Both the source node 106 and the destination node 108 can include one or more virtual machines ("VMs"). The illustrated source node 106 is shown with one VM ("VM$_1$") 116A. The illustrated destination node 108 is shown with one VM ("VM$_2$") 116B. The source node 106 and the destination node 108 each can include a MitMP module 118A, 118B, respectively. The MitMP modules 118A, 118B each maintain a distributed ledger 120 (e.g., maintained using blockchain or similar technology) that is configured to store a packet delay value for each link, such as the source-destination link 110 in the illustrated example. The packet delay value may be an average of packet delays experienced over a link over a specified period of time. Alternatively, the packet delay value can be a single packet delay value.

The MitMP modules 118 can determine an average packet delay value for a given link via traffic probe packets 122. The traffic probe packets 122 can be generated using an existing delay detector or a proprietary protocol. The proprietary protocol can enable the MitMP modules 118 to send the traffic probe packets 122 with different sizes and different intervals at once (next to each other) every X minutes, and the traffic probe packets 122 can require responses from their respective destinations. The delay of the traffic probe packets 122 can be averaged. Each MitMP module 118 can record the round trip times via reading the time stamps or by calculating the "time sent" of a particular traffic probe packet 122 and the "time received" of receiving the response for that particular traffic probe packet 122. The MitMP modules 118 can record historical delays for time of the day, week, month, and can compare the historical delays with the current delay to determine any outliers. The MitMP modules 118 can communicate with each other through the network 104 to check if there is a general delay increase all over the network 104 triggered by external factors (e.g., temporarily heavy demand for a streaming football game or other event), and/or internal factors such as several nodes and/or links that are down for maintenance or due to equipment failure. The MitMP modules 118 can adjust the packet delay compared to historical records to account for the other factors beyond a malicious attack.

The illustrated distributed ledger 120 stores an average packet delay for the source-destination link 110 (shown as packet delay$_{Src-Dest}$ 124). The distributed ledger 120 can store the average packet delay for an $n^{th}$ link in the network 104 (shown as packet delay$_n$ 124N). The $n^{th}$ link can involve the source node 106, the destination node 108, or both the source node 106 and the destination node 108, and one or more additional nodes (not shown). The MitMP module 118 of each node in the $n^{th}$ link can maintain the distributed ledger 120. In this manner, each MitMP module 118 can map out the network 104 with the most recent packet delay values for all links in the network 104.

After the MitMP module$_1$ 118A (and/or the MitMP module$_2$ 118B as the case may be) detects that the data traffic 114 has higher packet delays than normal (where normal delay can be established over time for each link in the network 104), the MitMP module$_1$ 118A can command the VM$_1$ 116A to be decommissioned. In particular, the resources upon which the VM$_1$ 116A operates can be freed up (i.e., no longer dedicated to the VM$_1$ 116A). Also, any VM software can be erased.

The MitMP module$_1$ 118A can communicate with a virtualization orchestrator 126 prior to, during, and after commanding the VM$_1$ 116A to be decommissioned. Each of the MitMP modules 118 can communicate with the virtualization orchestrator 126 on a secure dedicated channel (i.e., a different channel than the channel being used for communications between the VM$_1$ 116A and the virtualization orchestrator 126). Each time a MitMP module 118 transacts with the virtualization orchestrator 126, the transaction can be logged in the distributed ledger 120.

After the VM$_1$ 116A has been decommissioned, the virtualization orchestrator 126 can create a new node with a new MitMP module while the source node 106 continues to send/receive fake data traffic created by the MitMP module$_1$ 118A to convince the MitM attacker 112 that the MitM attack is/was successful. Each MitMP module 118 can be created by the virtualization orchestrator 126. The virtualization orchestrator 126 can keep track of the status of each MitMP module 118 using a MitMP management module 128 that handles all aspects and updates by all MitMP modules 118. Each MitMP module 118 can have an authentication key (not shown) to securely communicate with the virtualization orchestrator 126.

The virtualization orchestrator 126 can create the VMs 116 and the MitMP modules 118 for any number of nodes using virtualization resources 130 of the virtualization environment 102. The virtualization resources 130 can include compute, memory, and other virtualized resources as best illustrated and described herein with regard to an example cloud computing platform 600 shown in FIG. 6.

Figure 1B:
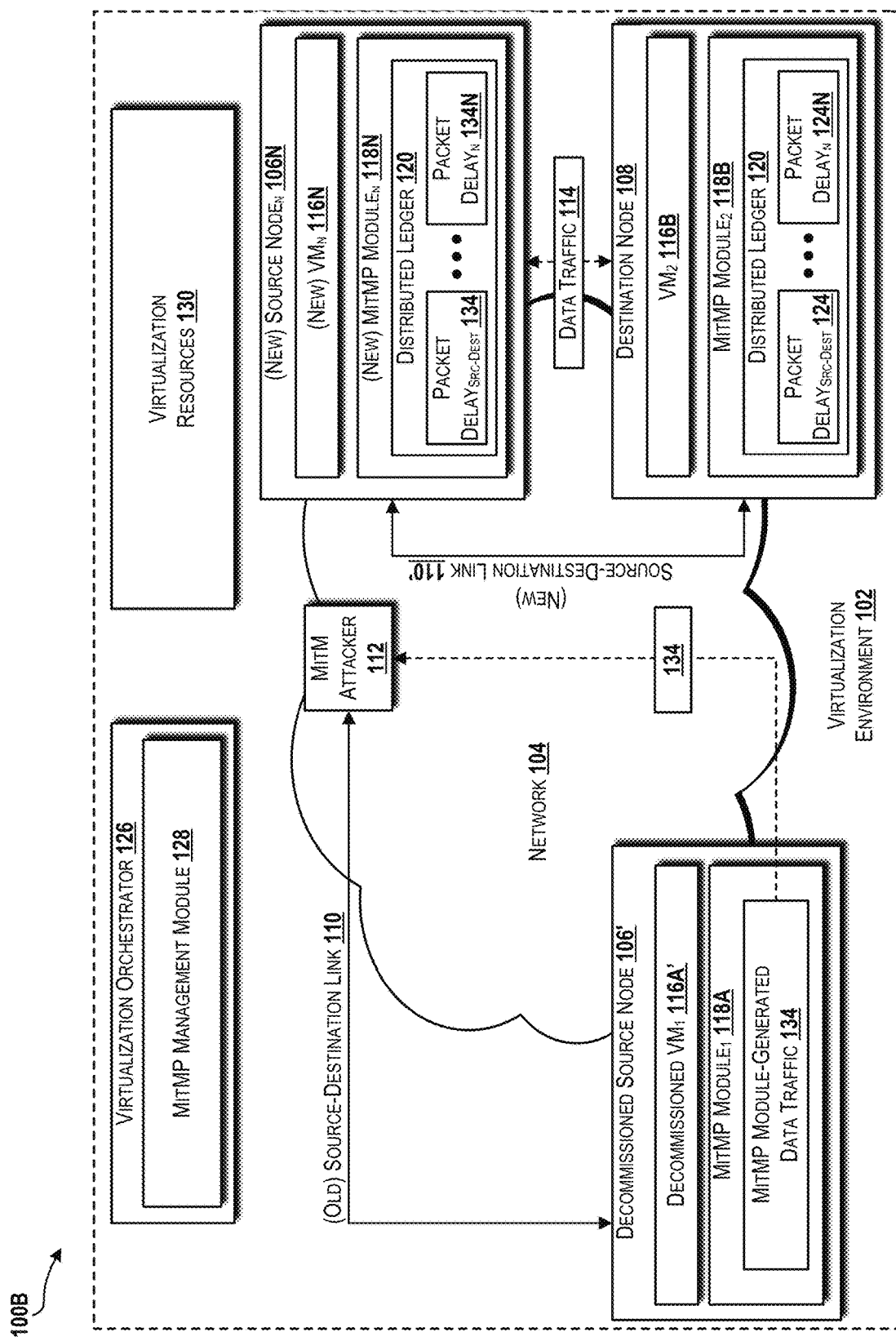

Turning now to FIG. 1B, an operating environment 100B is shown after the VM$_1$ 116A has been commanded, by the MitMP module$_1$ 118A, to be decommissioned. In particular, the operating environment 100B again shows the virtualization environment 102 introduced in FIG. 1A, but with the source node 106 now shown as a decommissioned source node 106' with a decommissioned VM$_1$ 116A' and the MitMP module$_1$ 118A. In addition, the source-destination link 110 (marked "old" in FIG. 1B) remains in communication with the MitM attacker 112. The MitMP module$_1$ 118A can then generate fake traffic that resembles the data traffic 114. The fake traffic is shown as MitMP module-generated data traffic 134. In some embodiments, the MitMP module-generated data traffic 134 can be generated, by the MitMP module$_1$ 118A, based upon one or more characteristics of the data traffic 114. For example, the MitMP module$_1$ 118A may generate replica data packets of the data packets contained in the data traffic 114 with the same payload size and/or header datum (or the entirety of the header) but with different raw data. The raw data can be randomly or pseudo-randomly generated or can be sourced from a database (not shown) of expired or otherwise no longer relevant data.

The virtualization orchestrator 126 can utilize the virtualization resources 130 to create an $n^{th}$ source node 106N with an $n^{th}$ VM 116N (marked "new" in FIG. 1B). The virtualization orchestrator 126 also can create the $n^{th}$ MitMP module 118N via the MitMP management module 128. The virtualization orchestrator 126 also creates a new source-destination link 110' between the $n^{th}$ source node 106N and the destination node 108 over which the data traffic 114 can be exchanged. In the meantime, the MitMP module$_1$ 118A, operating in the decommissioned source node 106', can generate and send the MitMP module-generated data traffic 134 to the MitM attacker 112. In this manner, the MitM attacker 112 will see the MitMP module-generated data traffic 134 (i.e., fake data traffic) instead of the data traffic 114 (i.e., real data traffic). Since the MitMP module-generated data traffic 134 is generated, by the MitMP module$_1$ 118A, based upon one or more characteristics of the data traffic 114, the MitMP module-generated data traffic 134 will appear similar to the data traffic 114 from the perspective of the MitM attacker 112. Accordingly, the MitM attacker 112 can be misdirected into thinking the MitM attack is/was successful.

Figure 2:
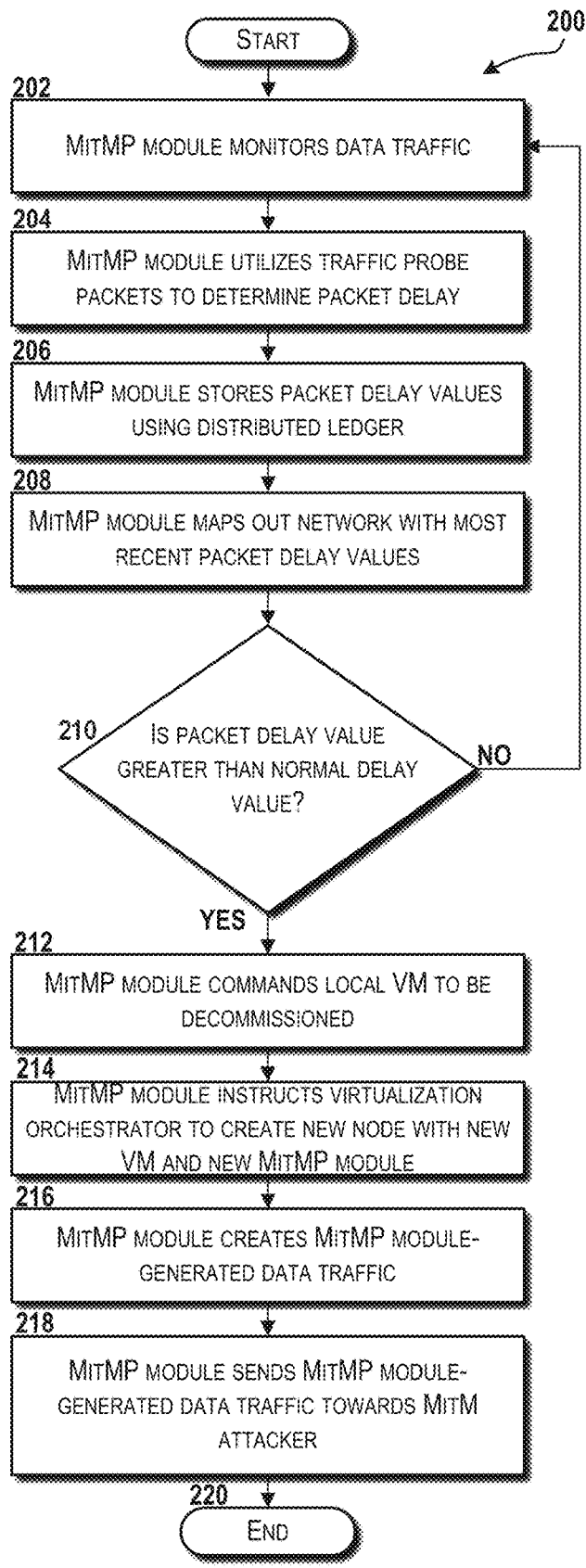
FIG. 2 is a flow diagram illustrating aspects of a method for protecting against man-in-the-middle ("MitM") attacks in virtualization environments, according to an illustrative embodiment.

Turning now to FIG. 2, a flow diagram illustrating aspects of a method 200 for protecting against MitM attacks in virtualization environments, such as the virtualization environment 102, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

For purposes of illustrating and describing some of the concepts of the present disclosure, the method 200 will be described as being performed, at least in part, by the MitMP module$_1$ 118A of the source node 106/decommissioned source node 106' (hereinafter the MitMP module 118). It should be understood that additional and/or alternative devices can provide the functionality described herein via execution of one or more modules, applications, and/or other software. Thus, the illustrated embodiments are illustrative, and should not be viewed as being limiting in any way.

The method 200 will be described with additional reference to FIG. 1. The method 200 begins and proceeds to operation 202. At operation 202, the MitMP module 118 monitors the data traffic 114 exchanged between the source node 106 and the destination node 108 over the source-destination link 110 via the network 104. From operation 202, the method 200 proceeds to operation 204. At operation 204, the MitMP module 118 utilizes the traffic probe packet(s) 122 to determine packet delay. The MitMP module 118 can generate and send the traffic probe packet(s) 122 towards the destination node 108. The MitMP module 118 can record a "sent" time for when the traffic probe packet 122 was sent. The MitMP module 118 also can record a "receipt" time for when the traffic probe packet 122 was received by the destination node 108. The "sent" and "receipt" times can be used to determine a packet delay. Over time, the MitMP module 118 can average the packet delays of multiple traffic probe packets 122 to determine an average packet delay. It should be understood, however, that a single traffic probe packet delay value may be used in some circumstances.

From operation 204, the method 200 proceeds to operation 206. At operation 206, the MitMP module 118 stores the packet delay value(s) using the distributed ledger 120. From operation 206, the method 200 proceeds to operation 208. At operation 208, the MitMP module 118 uses the distributed ledger 120 to map out the network 104 with the most recent packet delay values, which can include the most recent average packet delay value for each link (e.g., the source-destination link 110) in the network 104, or strictly the most recent packet delay value.

From operation 208, the method 200 proceeds to operation 210. At operation 210, the MitMP module 118 determines if the packet delay value for the specified link (i.e., the source-destination link 110 in this example) is greater than a normal delay value. The normal delay value can be determined over time by the traffic probe packets 122. A packet delay value that is less than the normal delay value causes the method 200 to revert back to operation 202, where the MitMP module 118 continues to monitor the data traffic 114. If, however, the packet delay value is determined, at operation 210, to be greater than the normal delay value, the method 200 proceeds to operation 212. At operation 212, the MitMP module 118 commands its local VM (i.e., the VM$_1$ 116A in this example) to be decommissioned. In FIG. 1A, the VM$_1$ 116A is shown operating on the source node 106 prior to receiving the command from the MitMP module 118 to be decommissioned. In FIG. 1B, the decommissioned VM$_1$ 116A' is shown in association with the decommissioned source node 106' after receiving, from the MitMP module 118, the command to be decommissioned.

From operation 212, the method 200 proceeds to operation 214. At operation 214, the MitMP module 118 instructs the virtualization orchestrator 126 to create a new node (best shown in FIG. 1B as source node$_N$ 106N) with a new VM (best shown in FIG. 1B as VM$_N$ 116N) and a new MitMP module (best shown in FIG. 1B as MitMP module$_N$ 118N). In response, the virtualization orchestrator 126 can create the source node$_N$ 106N, the VM$_N$ 116N, and the MitMP module$_N$ 118N using the virtualization resources 130.

From operation 214, the method 200 proceeds to operation 216. At operation 216, the MitMP module 118 of the decommissioned source node 106' creates MitMP module-generated data traffic 134. In some embodiments, the MitMP module-generated data traffic 134 can be generated, by the MitMP module$_1$ 118A, based upon one or more characteristics of the data traffic 114. For example, the MitMP module$_1$ 118A may generate replica data packets of the data packets contained in the data traffic 114 with the same payload size and header information but with different raw data. The raw data can be randomly or pseudo-randomly generated or can be sourced from a database (not shown) of expired or otherwise no longer relevant data.

From operation 216, the method 200 proceeds to operation 218. At operation 218, the MitMP module$_1$ 118A sends the MitMP module-generated data traffic 134 towards the MitM attacker 112 on the (old) source-destination link 110 (shown in FIG. 1B). In this manner, the MitM attacker 112 will see the MitMP module-generated data traffic 134 (i.e., fake traffic) instead of the data traffic 114 (i.e., real traffic). Since the MitMP module-generated data traffic 134 is generated, by the MitMP module$_1$ 118A, based upon one or more characteristics of the data traffic 114, the MitMP module-generated data traffic 134 will appear similar to the data traffic 114 from the perspective of the MitM attacker 112. Accordingly, the MitM attacker 112 can be misdirected into thinking the MitM attack is/was successful.

From operation 218, the method 200 proceeds to operation 220. The method 200 can end at operation 220.

Figure 3:
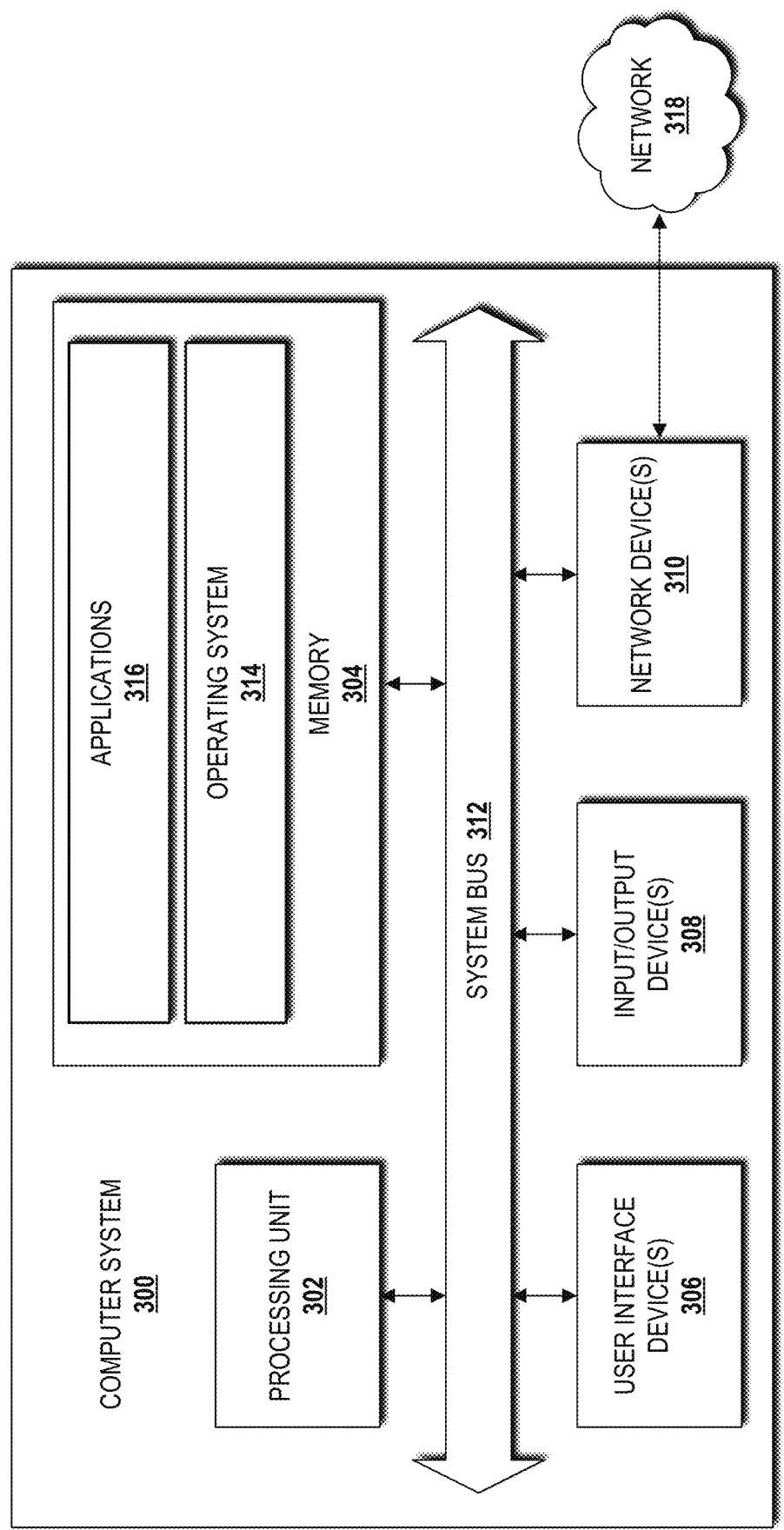
FIG. 3 is a block diagram illustrating an example computer system capable of implementing aspects of the embodiments presented herein.

FIG. 3 is a block diagram illustrating a computer system 300 configured to perform various operations disclosed herein. Aspects of the concepts and technologies disclosed herein can be implemented, at least in part, by the computer system 300. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310.

The processing unit 302 might be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and one or more applications 316. The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 306 may include one or more devices with which a user accesses the computer system 300. The user interface devices 306 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touchscreen, or an electronic stylus. Further, the I/O devices 308 may include one or more output devices, such as, but not limited to, a display screen or a printer. An I/O device 308 embodied as a display screen can be used to present information.

The network devices 310 enable the computer system 300 to communicate with a network 318, which can be or can include the network 104, the Internet, or some combination thereof. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a WLAN such as a WI-FI network, a WWAN, a wireless PAN ("WPAN") such as BLUETOOTH, or a wireless MAN ("WMAN"). Alternatively, the network 318 may be a wired network such as, but not limited to, a WAN such as the Internet, a LAN such as the Ethernet, a wired PAN, or a wired MAN.

Figure 4:
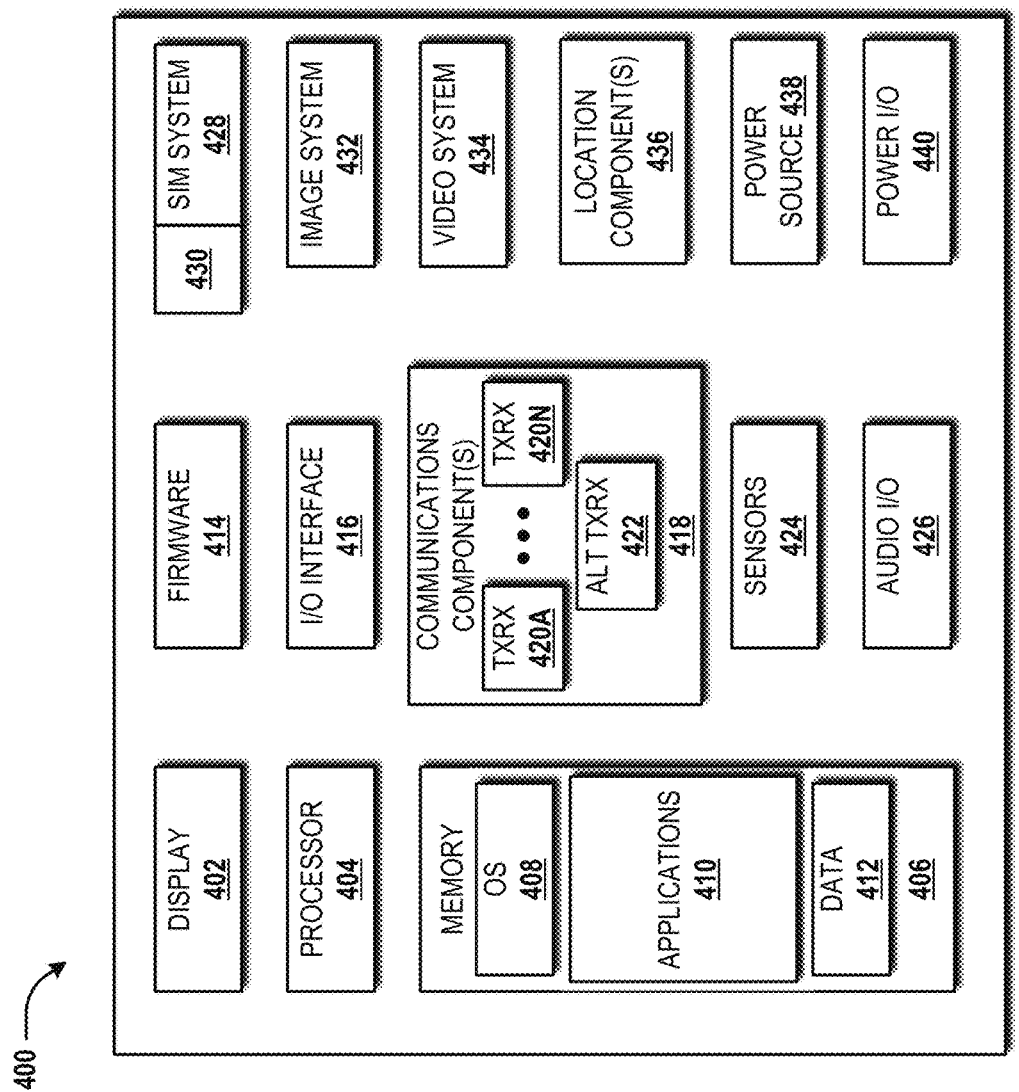
FIG. 4 is a block diagram illustrating an example mobile device capable of implementing aspects of the embodiments disclosed herein.

Turning now to FIG. 4, an illustrative mobile device 400 and components thereof will be described. Aspects of the concepts and technologies disclosed herein can be implemented, at least in part, by the mobile device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks, such as the network 104, the Internet, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 418 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/ WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/ or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
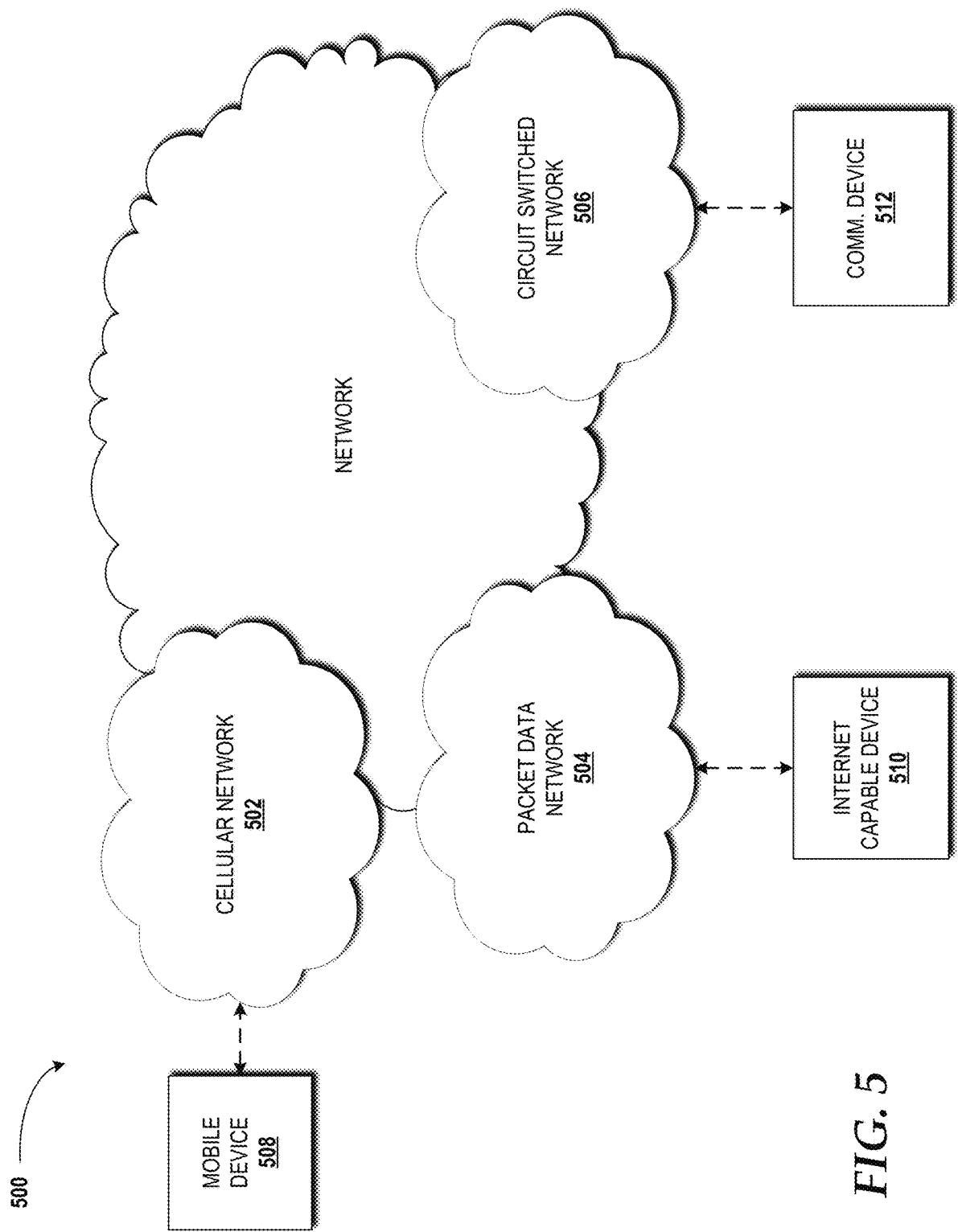
FIG. 5 is a diagram illustrating a network, according to an illustrative embodiment.

Turning now to FIG. 5, details of a network 500 are illustrated, according to an illustrative embodiment. The network 104 (FIG. 1) can be or can include at least a portion of the network 500. The network 500 includes a cellular network 502, a packet data network 504, and a circuit switched network 506 (e.g., a public switched telephone network).

The cellular network 502 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a GSM) network and can provide data communications via GPRS and/or EDGE. Additionally, or alternatively, the cellular network 502 can be configured as a 3G Universal Mobile Telecommunications System ("UMTS") network and can provide data communications via the HSPA protocol family, for example, HSDPA, EUL, and HSPA+. The cellular network 502 also is compatible with 4G mobile communications standards such as LTE, or the like, as well as evolved and future mobile standards.

The packet data network 504 includes various systems/devices, for example, the source node 106, the destination node 108, the new source node$_N$ 106N, the virtualization orchestrator 126, other servers, other systems, computers, databases, and other devices in communication with one another, as is generally known. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510 a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
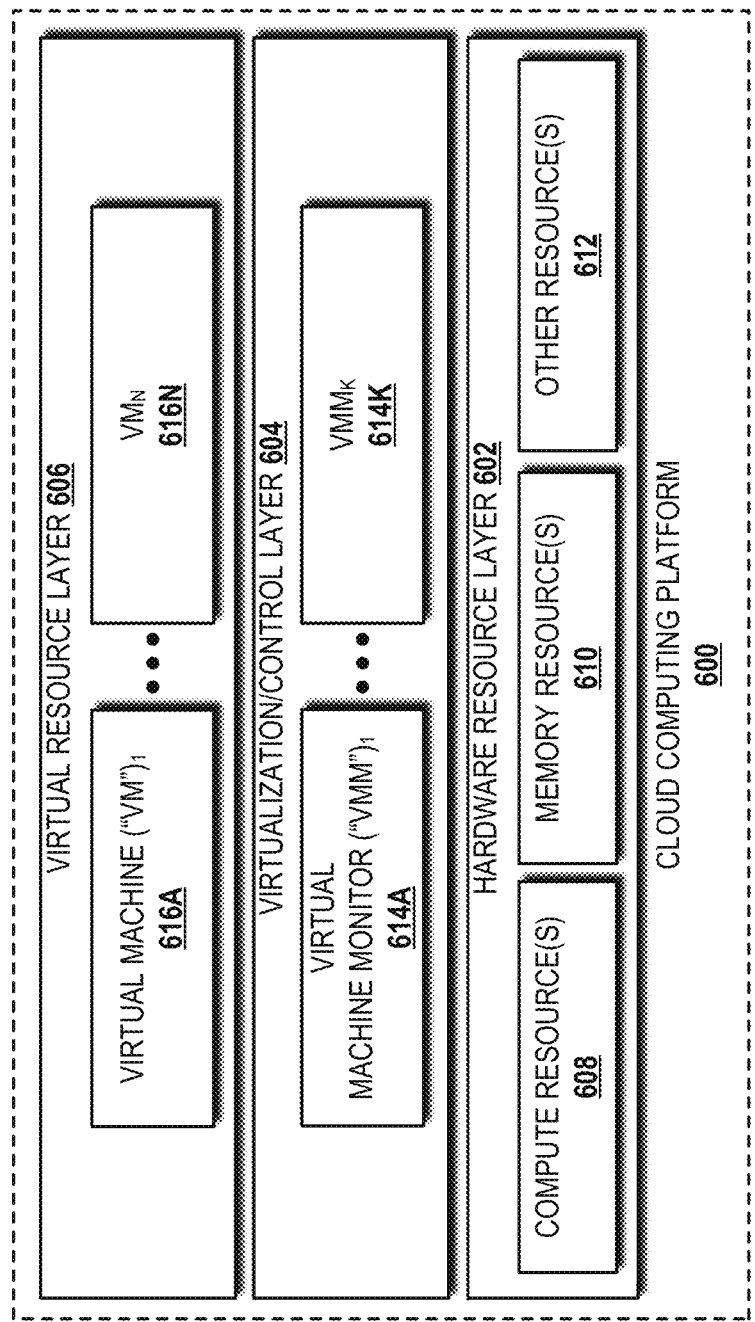
FIG. 6 is a diagram illustrating a cloud computing platform capable of implementing aspects of the embodiments disclosed herein.

Turning now to FIG. 6, a cloud computing platform 600 will be described, according to an exemplary embodiment. The architecture of the cloud computing platform 600 can be utilized to implement various elements disclosed herein, including, for example, the virtualization environment 102. The cloud computing platform 600 is a shared infrastructure that can support multiple services and network applications. The illustrated cloud computing platform 600 includes a hardware resource layer 602, a virtualization/control layer 604, and a virtual resource layer 606 that work together to perform operations as will be described in detail herein.

The hardware resource layer 602 provides hardware resources, which, in the illustrated embodiment, include one or more compute resources 608, one or more memory resources 610, and one or more other resources 612. The compute resource(s) 608 can include one or more hardware components that perform computations to process data, and/or to execute computer-executable instructions of one or more application programs, operating systems, and/or other software. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 608 can be or can include one or more hardware components architected in accordance with an advanced reduced instruction set computing ("RISC") ("ARM") architecture, available for license from ARM HOLDINGS of Cambridge, United Kingdom. Alternatively, the compute resources 608 can be or can include one or more hardware components architected in accordance with an x86 architecture, such an architecture available from INTEL CORPORATION of Mountain View, Calif., and others. Those skilled in the art will appreciate the implementation of the compute resources 608 can utilize various computation architectures, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 614A-614K (also known as "hypervisors;" hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as VMs. In the illustrated embodiment, the virtual resource layer 606 includes VMs 616A-616N (hereinafter "VMs 616;" e.g., the $VM_1$ 116A, the $VM_2$ 116B, and the $VM_N$ 116N). Each of the VMs 616 can execute one or more applications to perform the operations described herein.

Based on the foregoing, it should be appreciated that concepts and technologies for protection against MitM attacks in virtualization environments have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
monitoring, by a man-in-the-middle protection module associated with a source node comprising a virtual machine, data traffic exchanged between the source node and a destination node over a source-destination link via a network;
utilizing, by the man-in-the-middle protection module, a traffic probe packet to determine a packet delay value associated with the data traffic exchanged between the source node and the destination node over the source-destination link via the network;
storing, by the man-in-the-middle protection module, the packet delay value;
determining, by the man-in-the-middle protection module, that the packet delay value is greater than a normal packet delay value;
in response to determining that the packet delay value is greater than the normal packet delay value, determining, by the man-in-the-middle protection module, that a man-in-the-middle attacker has compromised the source-destination link;
commanding, by the man-in-the-middle protection module, the virtual machine to be decommissioned;
instructing, by the man-in-the-middle protection module, a virtualization orchestrator to create a new source node, a new virtual machine, and a new man-in-the-middle protection module, wherein the data traffic is rerouted to be exchanged between the new source node and the destination node over a new source-destination link via the network;
creating, by the man-in-the-middle protection module, fake data traffic comprising replica data packets of data packets contained in the data traffic; and
sending, by the man-in-the-middle protection module, the fake data traffic towards the man-in-the-middle attacker over the source-destination link via the network.

2. The method of claim 1, wherein storing, by the man-in-the-middle protection module, the packet delay value comprises storing, by the man-in-the-middle protection module, the packet delay value in a distributed ledger.

3. The method of claim 2, wherein the packet delay value comprises an average packet delay value.

4. The method of claim 2, further comprising mapping, by the man-in-the-middle protection module, the network with a most recent packet delay value for each link in the network; and wherein determining, by the man-in-the-middle protection module, that the packet delay value is greater than the normal packet delay value comprises determining that the most recent packet delay value for the source-destination link is greater than the normal packet delay value.

5. The method of claim 1, wherein creating, by the man-in-the-middle protection module, the fake data traffic comprises creating, by the man-in-the-middle protection module, the fake data traffic based upon a characteristic of the data traffic.

6. The method of claim 5, wherein the characteristic of the data traffic comprises a same payload size or a same header datum.

7. The method of claim 6, wherein the fake data traffic comprises raw data having the same payload size; and wherein the raw data is randomly generated, pseudo-randomly generated, expired, or otherwise no longer relevant to the data traffic.

8. A computer-readable storage medium having computer-executable instructions of a man-in-the-middle protection module stored thereon that, when executed by a processor, cause the processor to perform operations comprising:
monitoring data traffic exchanged between a source node and a destination node over a source-destination link via a network, wherein the source node comprises a virtual machine;
utilizing a traffic probe packet to determine a packet delay value associated with the data traffic exchanged between the source node and the destination node over the source-destination link via the network;
storing the packet delay value;

determining that the packet delay value is greater than a normal packet delay value;

in response to determining that the packet delay value is greater than the normal packet delay value, determining that a man-in-the-middle attacker has compromised the source-destination link;

commanding the virtual machine to be decommissioned;

instructing a virtualization orchestrator to create a new source node, a new virtual machine, and a new man-in-the-middle protection module, wherein the data traffic is rerouted to be exchanged between the new source node and the destination node over a new source-destination link via the network;

creating fake data traffic comprising replica data packets of data packets contained in the data traffic; and sending the fake data traffic towards the man-in-the-middle attacker over the source-destination link via the network.

9. The computer-readable storage medium of claim 8, wherein storing the packet delay value comprises storing the packet delay value in a distributed ledger.

10. The computer-readable storage medium of claim 9, wherein the packet delay value comprises an average packet delay value.

11. The computer-readable storage medium of claim 9, wherein the operations further comprise mapping the network with a most recent packet delay value for each link in the network; and wherein determining that the packet delay value is greater than the normal packet delay value comprises determining that the most recent packet delay value for the source-destination link is greater than the normal packet delay value.

12. The computer-readable storage medium of claim 8, wherein creating the fake data traffic comprises creating the fake data traffic based upon a characteristic of the data traffic.

13. The computer-readable storage medium of claim 12, wherein the characteristic of the data traffic comprises a same payload size or a same header datum.

14. The computer-readable storage medium of claim 13, wherein the fake data traffic comprises raw data having the same payload size; and wherein the raw data is randomly generated, pseudo-randomly generated, expired, or otherwise no longer relevant to the data traffic.

15. A distributed man-in-the-middle protection system comprising:

a plurality of nodes operating in a network provided, at least in part, via a virtualization environment, wherein the plurality of nodes comprises a source node and a destination node;

wherein the source node comprises a virtual machine and a man-in-the-middle protection module, wherein the man-in-the-middle protection module comprises computer-executable instructions that, when executed, perform operations comprising monitoring data traffic exchanged between the source node and the destination node over a source-destination link via the network, utilizing a traffic probe packet to determine a packet delay value associated with the data traffic exchanged between the source node and the destination node over the source-destination link via the network, storing the packet delay value, determining that the packet delay value is greater than a normal packet delay value, in response to determining that the packet delay value is greater than the normal packet delay value, determining that a man-in-the-middle attacker has compromised the source-destination link, commanding the virtual machine to be decommissioned, instructing a virtualization orchestrator to create a new source node, a new virtual machine, and a new man-in-the-middle protection module, wherein the data traffic is rerouted to be exchanged between the new source node and the destination node over a new source-destination link via the network, creating fake data traffic comprising replica data packets of data packets contained in the data traffic, and sending the fake data traffic towards the man-in-the-middle attacker over the source-destination link via the network.

16. The distributed man-in-the-middle protection system of claim 15, wherein storing the packet delay value comprises storing the packet delay value in a distributed ledger.

17. The distributed man-in-the-middle protection system of claim 16, wherein the packet delay value comprises an average packet delay value.

18. The distributed man-in-the-middle protection system of claim 16, wherein the operations further comprise mapping the network with a most recent packet delay value for each link in the network; and wherein determining that the packet delay value is greater than the normal packet delay value comprises determining that the most recent packet delay value for the source-destination link is greater than the normal packet delay value.

19. The distributed man-in-the-middle protection system of claim 15, wherein creating the fake data traffic comprises creating the fake data traffic based upon a characteristic of the data traffic.

20. The distributed man-in-the-middle protection system of claim 19, wherein the characteristic of the data traffic comprises a same payload size; wherein the fake data traffic comprises raw data having the same payload size; and wherein the raw data is randomly generated, pseudo-randomly generated, expired, or otherwise no longer relevant to the data traffic.

* * * * *